Figure 1:
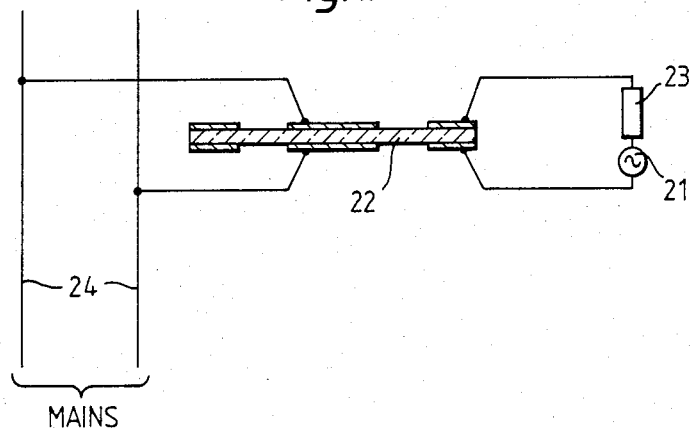

United States Patent [19]

Hattersley

[11] Patent Number: 4,529,904

[45] Date of Patent: Jul. 16, 1985

[54] PIEZO-ELECTRIC TERMINAL STATION FOR COMMUNICATIONS SYSTEM

[75] Inventor: Kenneth R. Hattersley, Epping, England

[73] Assignee: International Standard Electric Corporation, New York, N.Y.

[21] Appl. No.: 589,972

[22] Filed: Mar. 15, 1984

[30] Foreign Application Priority Data

Mar. 16, 1983 [GB] United Kingdom ............ 8307240

[51] Int. Cl.³ ........................................... H01L 41/08
[52] U.S. Cl. .................................. 310/318; 310/366; 310/369
[58] Field of Search ............................. 310/314–319, 310/366, 359, 369

[56] References Cited

U.S. PATENT DOCUMENTS 4,392,074 7/1983 Kleinschmidt et al. ........ 310/319 X

Primary Examiner—Mark O. Budd
Attorney, Agent, or Firm—John T. O'Halloran; Jeffrey P. Morris

[57] ABSTRACT

A terminal station for communication with one or more similar remote stations via mains wiring includes a piezo-electric coupler (22) whereby carrier signals are transmitted to and received from the line (24). The coupler is driven by an oscillator (21) modulated in correspondence with an input signal and tuned to the resonant frequency of the coupler.

9 Claims, 4 Drawing Figures

PIEZO-ELECTRIC TERMINAL STATION FOR COMMUNICATIONS SYSTEM

This invention relates to communication apparatus and in particular to a terminal station for communication with similar stations via a wired system comprising e.g. an electric mains supply.

Terminal stations for communication via mains wiring must be provided with some means whereby electrical isolation from the mains is achieved. Typically an isolating transformer is used for this purpose. Many such devices for example employ a transformer and a high voltage capacitor which together form a resonant circuit tuned to a carrier frequency on which signal are superimposed for transmission to a remote station. Such capacitors and transformers are bulky and relatively expensive to manufacture. Also a tuned circuit of this type requires careful design to ensure that the correct frequency is obtained and that the isolation is maintained with continued exposure to mains transients.

The object of the present invention is to minimise or to overcome these disadvantages.

According to one aspect of the invention there is provided a terminal station for communication via electrical wiring with one or more similar stations, the station including means for modulating a carrier signal with signals for transmission, means for demodulating received carrier signals, and an electrically insulating piezo-electric coupler resonant at said carrier frequency whereby the station may be coupled to the mains wiring.

According to another aspect of the invention there is provided a communication system, including a plurality of terminal stations interconnected by wiring via which signals may be transmitted between stations, wherein each said station is coupled to the wiring via an acoustic path comprising an electrically insulating piezo-electric coupler resonant at a frequency at which said signals are transmitted.

Typically the coupler comprises a disc of a piezo-electric material such as barium titanate or a barium titanate modified with lead zirconate titanate. These materials can be processed at low cost by mass production ceramic techniques to provide accurately dimensioned devices. The piezoelectric structure has deposited on both sides an electrode pattern whereby electrocoustic coupling is effected. This electrode pattern may be provided by well known manufacturing techniques.

A plurality of similar terminal stations may be interconnected via a wiring system, e.g. electrical mains wiring, to form a communication system. Advantageously each station is provided with a plug connector whereby connection with a mains wiring system via the outlet sockets may be effected.

Figure 2:
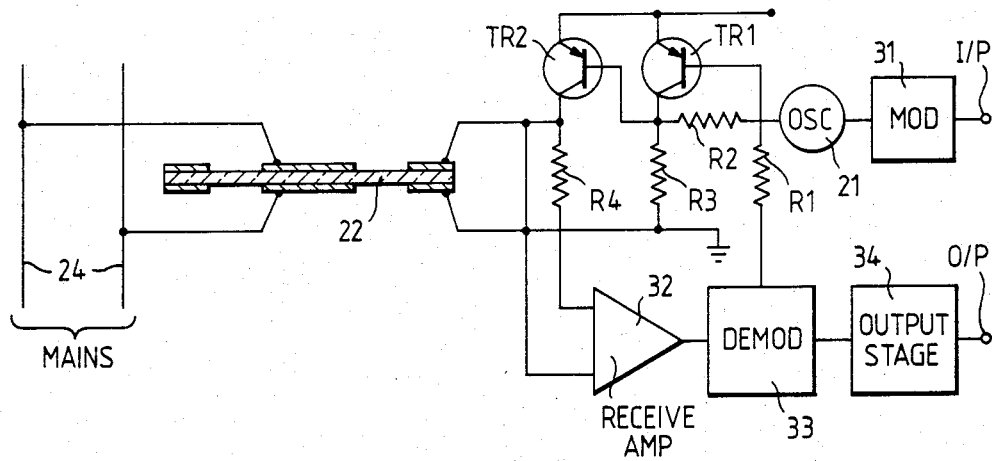
Figure 3:
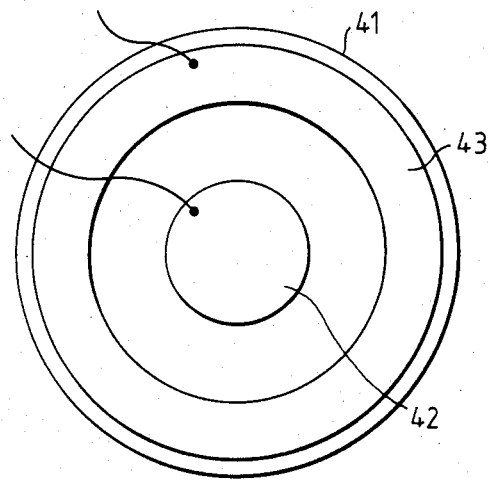
Figure 4:
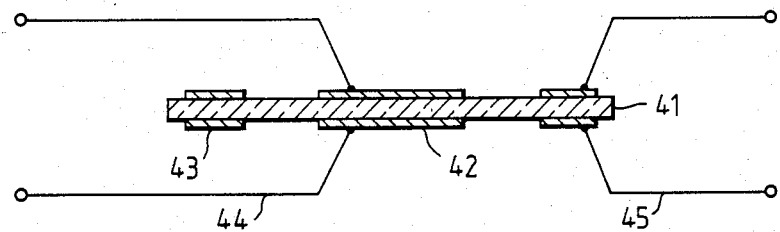

An embodiment of the invention will now be described with reference to the accompanying drawings in which:

FIG. 1 is a schematic diagram of the terminal station;
FIG. 2 shows further detail of the station of FIG. 1; and FIGS. 3 and 4 are respectively plan and sectional views of the line coupler of the station of FIGS. 1 and 2.

Referring to FIG. 1, the terminal station includes an oscillator 21 coupled to a piezo-electric coupler 22 via a load 23. The coupler 22 in turn provides coupling of the station to the conductors 24 of an electrical mains wiring system. The oscillator is tuned to the resonant frequency of the coupler, typically in the range 40 to 140 kHz. The oscillator output, which is modulated with the signal to be transmitted, causes the piezo-electric coupler 22 to resonate mechanically. Acoustic signals are transmitted across the coupler from input terminals 25 to output terminals 26 where the electrical signal is recovered and fed to the mains for transmission to a remote station. This acoustic coupling avoids the need for direct electrical connection between the station and the line and thus provides a high degree of electrical isolation. In a similar way received electrical signal from the line are transmitted back across the coupler as acoustic signals and are then converted back to electrical signals for processing by a receiver circuit (not shown).

For data transmission we prefer to employ frequency shift keying (FSK), but it will of course be clearly understood that other methods of modulation may be employed. In practice an appropriate form of modulation will be chosen according to the particular nature of the signal to be transmitted.

FIG. 2 shows the terminal station in further detail. Signals applied at an input I/P are fed to a modulation circuit 31 which circuit modulates the output of the oscillator 21. This modulated signal is fed via resistor R2 to the base transistor TR2, converted in the common emitter mode, which provides the output drive to the piezo-electric coupler 22 whereby the signals are transmitted via the line 24 to a remote station.

Incoming signals from the line are fed via a receive amplifier 32 to a demodulator 33 where the original signal is recovered and fed to an output stage 34. In some applications the demodulator may have a further output connected via resistor R1 to the base of transistor TR1. The arrangement is such that, when a transmission is received from a remote station, transistor TR1 is turned on thus turning off transistor TR2 and effectively disabling the transmitting channel of the station.

FIGS. 3 and 4 show the piezo-electric coupler in detail. The coupler comprises a body, e.g. a disc, 41 of piezo-electric material and whose thickness is significantly less than the diameter. Typically the material is a pure barium titanate or a barium titanate modified with lead titanate. The disc is provided on both major surfaces with central disc electrodes 42 and outer annular electrodes 43. The disc 41 and the electrodes 42 and 43 are all mutually concentric. Typically the outer electrodes 43 provide the input port of the coupler and the electrodes 42 the output port to the line. Contact is effected to the inner electrodes via leads 44 and to the outer electrodes via leads 45.

The resonant frequency of the coupler is a function of its dimensions. The body can be made to resonate in a number of preferred modes, but for a thin disc the radial mode is dominant. The frequency, $f_r$, of resonance, to a first approximation, is given by the expression $$fr = K/D$$

where K is the frequency constant of the material in kilohertz/mm and D is the disc diameter in mm. For most applications a resonant frequency in the range 40 to 140 kHz will be suitable. In one construction the inner electrodes 42 may be 0.6D, and the outer, annular, electrodes 43 may have an inner diameter of 0.8D and an outer diameter of 0.96D. These particular dimensions, although not critical, have been found to provide adequate coupling.

Other electrode configurations are of course possible but the concentric arrangement described in FIGS. 3 and 4 is to be preferred as it offers optimum operation at the fundamental radial frequency whilst providing sufficient electrode separation to give adequate electrical isolation between the input and output ports.

I claim:

1. A terminal station for communication via a pair of mains wires said terminal station comprising:

a piezo-electric coupler of a circular configuration and of a disc-like shape wherein said thickness is significantly less than said diameter, said disc having on both major surfaces central disc electrodes each surrounded by outer concentric annular electrode with the outer electrode manifesting an input port for the terminal station and with the inner central electrodes manifesting an output port, said coupler dimensioned to have a resonant frequency within the range of 40–140 KHz, according to the diameter of said disc, means coupling the inner central electrodes to said pair of mains wires, a modulator having an input adapted to receive an input signal for providing at an output a modulation control signal, an oscillator having an input coupled to the output of said modulator for providing at an output a modulated signal of a frequency according to the resonant frequency of said coupler, with the output of said oscillator coupled to the input of a coupler driver having an output coupled to one of said outer electrodes, with said other outer electrode coupled to a point of reference potential to activate said coupler to transmit modulated signals to said mains wires with the output of said coupler driver further connected to one input of a differential receive amplifier for receiving modulated signals, a demodulator coupled to the output of said receive amplifier for demodulating received signals and means connected between said demodulator and said coupler driver to disable said driver when modulated signals are being received from said mains.

2. The terminal station according to claim 1 wherein said central disc electrodes have a diameter of 0.6 the diameter of said disc.

3. The terminal station according to claim 1 wherein said outer concentric annular electrodes have an inner diameter of 0.8 the diameter of said disc with an outer diameter of 0.96 the diameter of said disc.

4. The terminal station according to claim 1, wherein said coupler driver is a first common emitter transistor amplifier having a collector electrode connected to said one outer electrode, with a collector resistor coupled to the other input of said receive differential amplifier.

5. The terminal station according to claim 4 wherein said means connected between said demodulator and said driver includes a second common emitter transistor amplifier having its base electrode connected to the output of said demodulator and having its collector electrode connected to the base of said coupler common emitter driver.

6. The terminal station according to claim 1 wherein said piezo-electric coupler is fabricated from a material selected from either barium titanate or barium titanite modified with lead zirconate titanite.

7. The terminal station according to claim 1 wherein said modulated signals are FSK signals.

8. The terminal station system according to claim 1 wherein there is a plurality of terminal stations each including a separate coupler, modulator, oscillator, coupler driver, receive amplifier, demodulator and means connected between said demodulator and said coupler driver.

9. The terminal station according to claim 1 wherein said coupler is caused to resonate in its fundamental radial mode.

* * * * *